No. 607,466. Patented July 19, 1898.
F. H. RICHARDS.
WEIGHING MACHINE.
(Application filed Nov. 4, 1897.)

(No Model.) 6 Sheets—Sheet 1.

Fig. 1.

Witnesses:
O. W. Smith
Fred. J. Dole.

Inventor:
F. H. Richards

No. 607,466. Patented July 19, 1898.
F. H. RICHARDS.
WEIGHING MACHINE.
(Application filed Nov. 4, 1897.)
(No Model.) 6 Sheets—Sheet 2.

Fig. 2.

Witnesses;
C. W. Smith
Fred. J. Dole.

Inventor;
F. H. Richards.

No. 607,466. Patented July 19, 1898.
F. H. RICHARDS.
WEIGHING MACHINE.
(Application filed Nov. 4, 1897.)
(No Model.) 6 Sheets—Sheet 3.

Witnesses:
C. W. Smith
Fred. J. Dole.

Inventor:
F. H. Richards.

No. 607,466. Patented July 19, 1898.
F. H. RICHARDS.
WEIGHING MACHINE.
(Application filed Nov. 4, 1897.)
(No Model.) 6 Sheets—Sheet 4.

Fig. 4.

Witnesses:
O. W. Smith
Fred. J. Dole.

Inventor:
F. H. Richards.

No. 607,466. Patented July 19, 1898.
F. H. RICHARDS.
WEIGHING MACHINE.
(Application filed Nov. 4, 1897.)
(No Model.) 6 Sheets—Sheet 6.

Witnesses:
C. W. Smith
Fred. J. Dole.

Inventor:
F. H. Richards.

THE NORRIS PETERS CO., PHOTO-LITHO., WASHINGTON, D. C.

UNITED STATES PATENT OFFICE.

FRANCIS H. RICHARDS, OF HARTFORD, CONNECTICUT.

WEIGHING-MACHINE.

SPECIFICATION forming part of Letters Patent No. 607,466, dated July 19, 1898.

Application filed November 4, 1897. Serial No. 657,357. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, the object thereof being to provide an improved machine constructed to weigh and discharge large loads of material with accuracy and rapidity, certain of the improvements being especially intended for application to machines of the kind disclosed by Letters Patent No. 572,067, granted to me November 24, 1896.

In the drawings accompanying and forming part of this specification.

Similar characters designate like parts in all the figures of the drawings.

The framework of the machine may be of any suitable construction, and it is illustrated consisting of the chambered base or bed 2, the side frames 3 and 4, mounted on said base, and the brackets 5 and 6, which extend oppositely from the supply-hopper H.

The hopper H has a series of spouts, as 7 and 8, serving to overload the weighing mechanism, the principal spout 7 delivering its stream into the main load-receiver and the small or auxiliary spout 8 its stream into the auxiliary load-receiver, hereinafter more particularly described.

The weighing mechanism consists in the present case of main and auxiliary load-receivers, as G and G', supported upon beam mechanism consisting, preferably, of counterweighted beams, as B and B', of the usual construction, pivotally mounted on the base and counterweighted, as at W and W'. The auxiliary load-receiver is movably mounted between the posts or uprights 9 and 10 on the rear upper side of the main load-receiver G, the latter being suspended by the two links 9' and 10' in the usual manner upon the poising ends of the two beams. The main load-receiver has the usual discharge-outlet, that represented being of considerable area to permit the contents of said load-receiver to be emptied with rapidity when the closer mechanism is released and opened.

Figure 5:
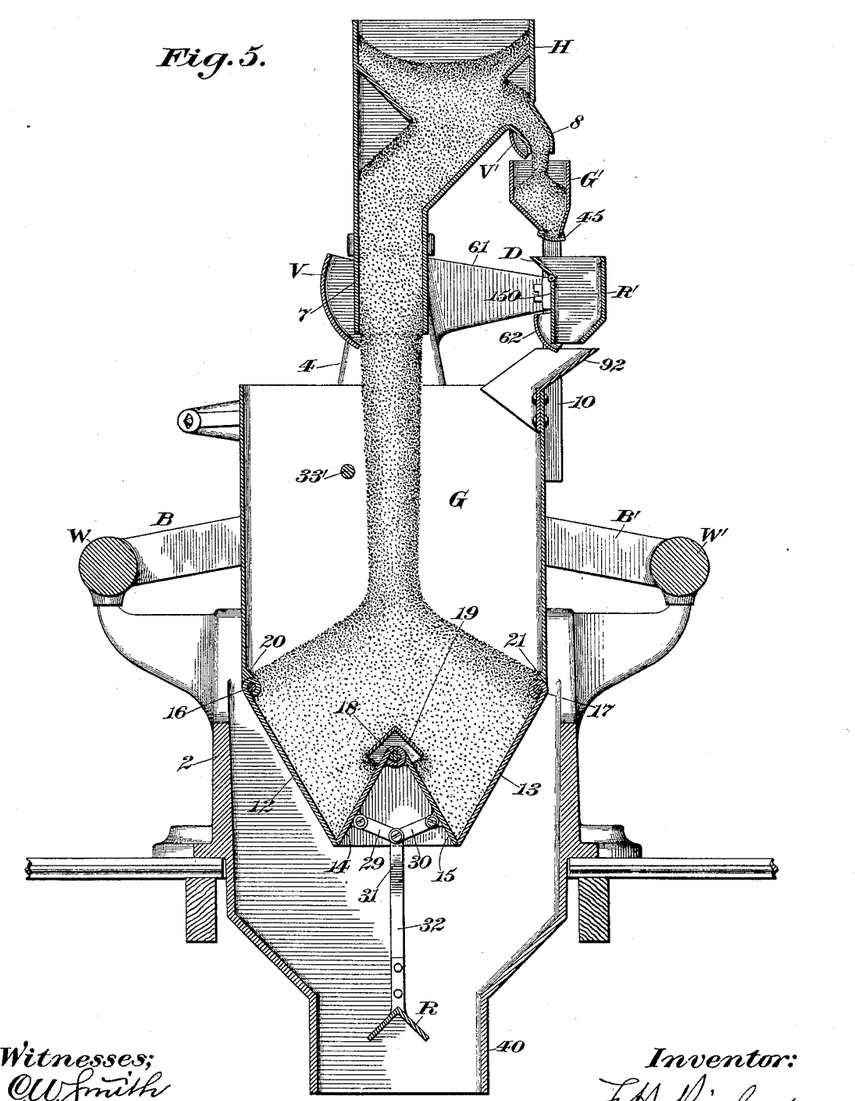
Fig. 5 is a longitudinal central section of the machine, showing the streams flowing into the weighing mechanism.

The closer mechanism, which covers the discharge-outlet when shut, consists in the present case of a pair of main closers, as 12 and 13, and a pair of supplemental closers, as 14 and 15, the respective closers of each pair being supported for movement toward and from a coöperating closer of the other pair as they alternately open and shut. The two closers 12 and 14 move toward and from each other, while the closers 13 and 15 move toward and from each other, and they are so constructed that when shut the discharge edges of the two sets thereof are in contact, as shown in Fig. 5, the discharge-outlet of the load-receiver G then being closed. The main closers 12 and 13 are fixed to and depend from the rock-shafts 16 and 17, respectively, extending transversely across the load-receiver and supported in bearings thereon, while the auxiliary closers are carried upon the transverse shaft 18 in the load-receiver. The shaft of the auxiliary closers is situated under the guard 19, located within and secured to the opposite walls of said load-receiver, said guard serving to prevent the entrance of material into the bearings of the shaft for the auxiliary closers. For the same purpose the bearings of the main closers are protected by the overhanging ribs 20 and 21, respectively, the under surfaces of which are curved, and against which the complementary curved surfaces of said main closers are adapted to work.

Figure 1:
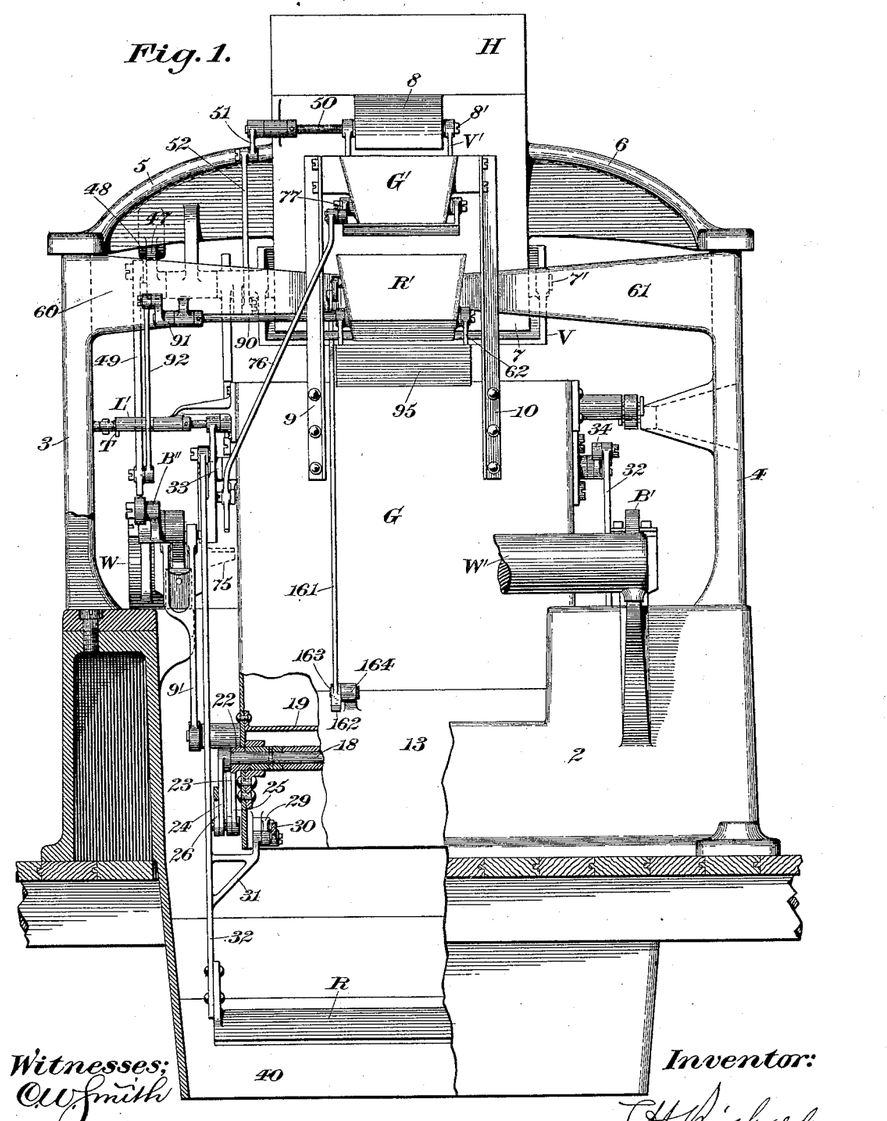
Figure 1 is a front elevation of a machine including my present improvements.

The several closers are connected together for simultaneous operation, the following-described connections serving efficiently for assuring such operation: The shaft or pivot 18 for the auxiliary closers 14 and 15 is supported in the opposite end walls of the load-receiver for rocking movement, the closer 14 being fixed to said shaft for movement therewith, while the auxiliary closer 15 is loosely sleeved to said shaft. The sleeve 22 on the closer 15 projects from the load-receiver and carries the crank-arm 23, (see Fig. 1,) the rock-shaft 18 carrying a similar crank-arm 24, to which the links 25 and 26, respectively, are pivoted, said links being similarly jointed to the lower ends of the crank-arms 27 and 28 on the shafts or pivots 16 and 17 of the main closers 12 and 13.

The auxiliary closers 14 and 15 are connected together by the two pairs of short links, the respective members of which are designated by 29 and 30, said links being connected to each other and also to projections, as 31, on the upright connectors or rods 32.

In Fig. 5 the several closers are represented shut, in which position they are held by a latch, as will hereinafter appear, and when they are released at the proper time the weight of material in the load-receiver G, acting against the several closers, will spread them apart simultaneously by reason of the described connection, and as they swing open the upright rods 32 will be lowered through the described connections.

The rods 32 are jointed at their upper ends to the crank-arms 33 and 34, secured to opposite ends of the rock-shaft 33', the crank-arm 33 being preferably engaged by a latch, as L', of ordinary construction to hold the closers shut. A gravity closer-shutting member is preferably provided, such member consisting in the present case of the segmental weight 35, secured to the crank-arm 33.

As hereinbefore stated, when the latch L' is tripped the rods 32 at opposite sides of the load-receiver, and consequently the several closer-blades, will be released, so that said closers can be forced open or apart by the mass in the main load-receiver G, the rods 32 as the closer is opened being drawn downward. As the rods are lowered the weight 35 is elevated, and it acts to shut the several closers at the proper time by swinging the discharge edges of the respective pairs toward each other—that is to say, the rods 32 are elevated, and as they rise they operate through the pairs of connected links 29 and 30, attached to the auxiliary closers 14 and 15, to swing the latter oppositely away from each other, and the crank-arms 23 and 24 and links 25 and 26 will, through the connections with the auxiliary closers, be swung in an opposite direction to the movement of the auxiliary closers, whereby the links 25 and 26, and consequently the crank-arms 27 and 29 and main closers 12 and 13, can be moved in a coinciding path, the result being that the discharge edges of the closers 12 and 14 and of the closers 15 and 13 are moved toward each other to shut the closers.

For the purpose of retarding the shutting movement of the closers, so as to allow ample time for the passage of the complete load from the weighing mechanism, a closer-retarding regulator, such as R, is employed, the latter consisting in the present case of a substantially inverted-V-shaped plate secured between and to the upright rods 32 and operable in the conduit 40, secured to and disposed below the base 2 of the machine.

Figure 4:
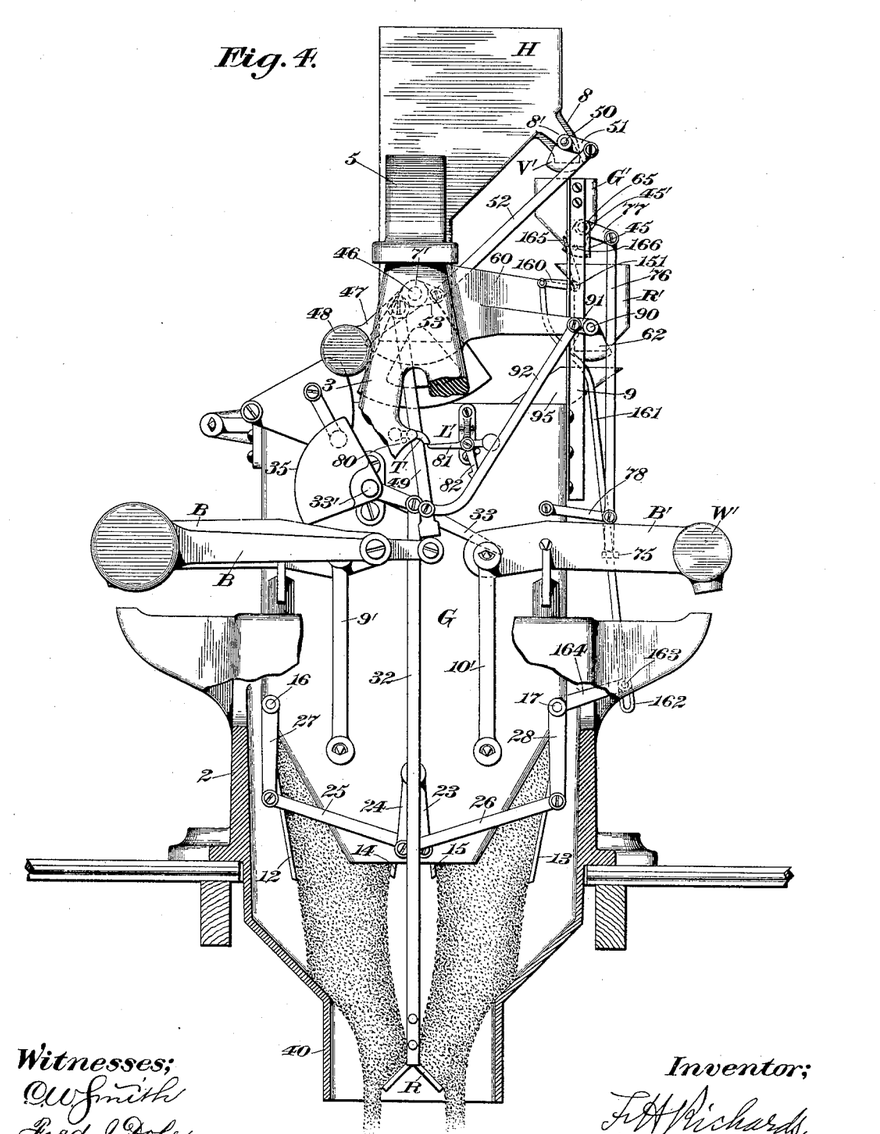
Figure 6:
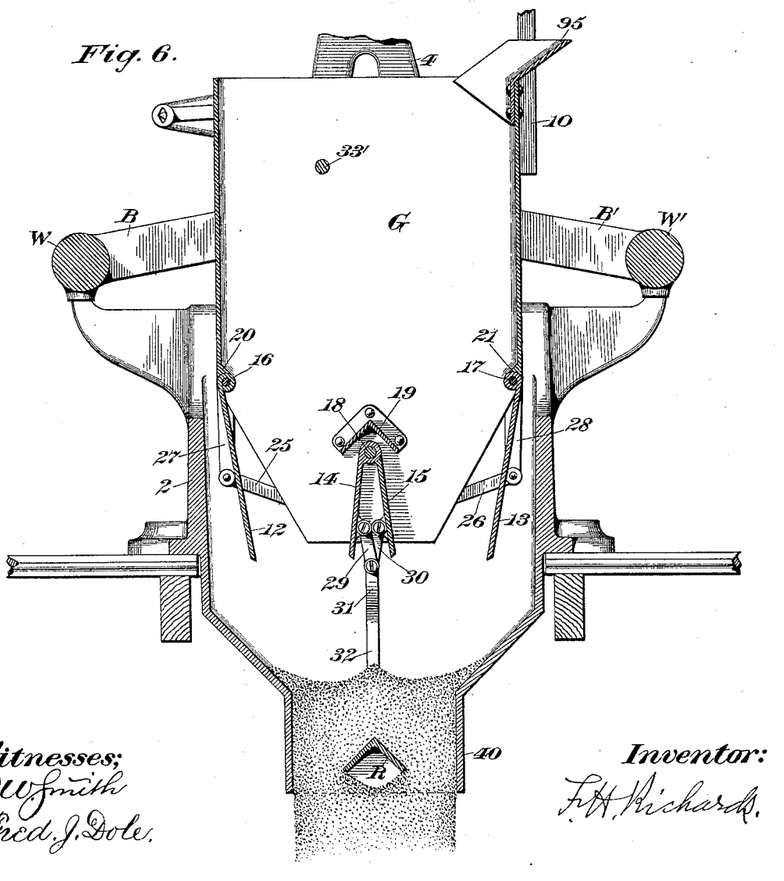
Fig. 6 is a similar view with the supply apparatus removed and the closers open.

The load from the receiver G is discharged in two streams, as shown in Fig. 4, against the opposite inclined sections of the regulator, so as to hold the latter down and the closers open, as shown in Fig. 6.

When the discharged load has practically passed from the regulator, the latter being situated relatively remote from the load-receiver, the weight 35 by dropping can elevate the rods 32 and through the hereinbefore-described connections with said rod and the closers the latter will be simultaneously shut, and when in such position the crank-arm 33 will be engaged by the latch L' on the load-receiver.

The main and the supplemental spouts 7 and 8 of the supply-hopper H serve, respectively, to direct a large and a small stream to the main and auxiliary receivers G and G' to furnish an overload. The auxiliary receiver is supported upon the main receiver, as hereinbefore described, and its outlet is controlled, preferably, by a valve, as 45, pivoted, as at 45', to said auxiliary receiver, said valve being shut during the flow of the two supply-streams. The outlets of the hopper H are also preferably governed by valves, as V and V', adapted simultaneously to swing under the spouts 7 and 8, respectively, to cut off the supply to the two receivers.

The main valve V is pivotally supported below, as at 7', to the opposite side walls of the spout 7 in some convenient manner, it being furnished with the lateral projection 46, carrying the weighted arm 47, the weight 48 of which acts normally to close the valve, such action, however, being preferably limited by the weighing mechanism or by the auxiliary beam B'', operable upon the beam B in the manner shown in Letters Patent hereinbefore referred to.

A controlling-rod is shown at 49, pivotally attached to the valve-actuating arm 47, the free end of said rod bearing against the inner or poising end of the beam B'', so that as the latter descends with the load-receiver during the making of a load it moves away from the lower end of the rod 49 and permits the weight 48 to drop, whereby the valve V can be swung under the opening of the main spout 7. The auxiliary valve V' is similarly pivoted, as at 8', below the auxiliary spout 8, it being equipped with the lateral projection 50, having the crank-arm 51, to which the rod 52 is connected, said rod being also attached to the crank-arm 53 on the shaft-section 46 of the main valve V, whereby through the described connections as said main valve closes the auxiliary valve will also be closed, said valves simultaneously reaching positions to cut off the supply when the load-receivers have been overloaded.

When the load-receivers are overloaded, they are carried to the limit of their downstroke, it being understood that part of the overload is in the main receiver G, while the remainder or a comparatively small part of the mass is in the auxiliary receiver G', and from the latter the surplus is withdrawn for delivery to a surplus-receiver situated, preferably, between the main and auxiliary load-receivers and supported on the framework.

Figure 2:
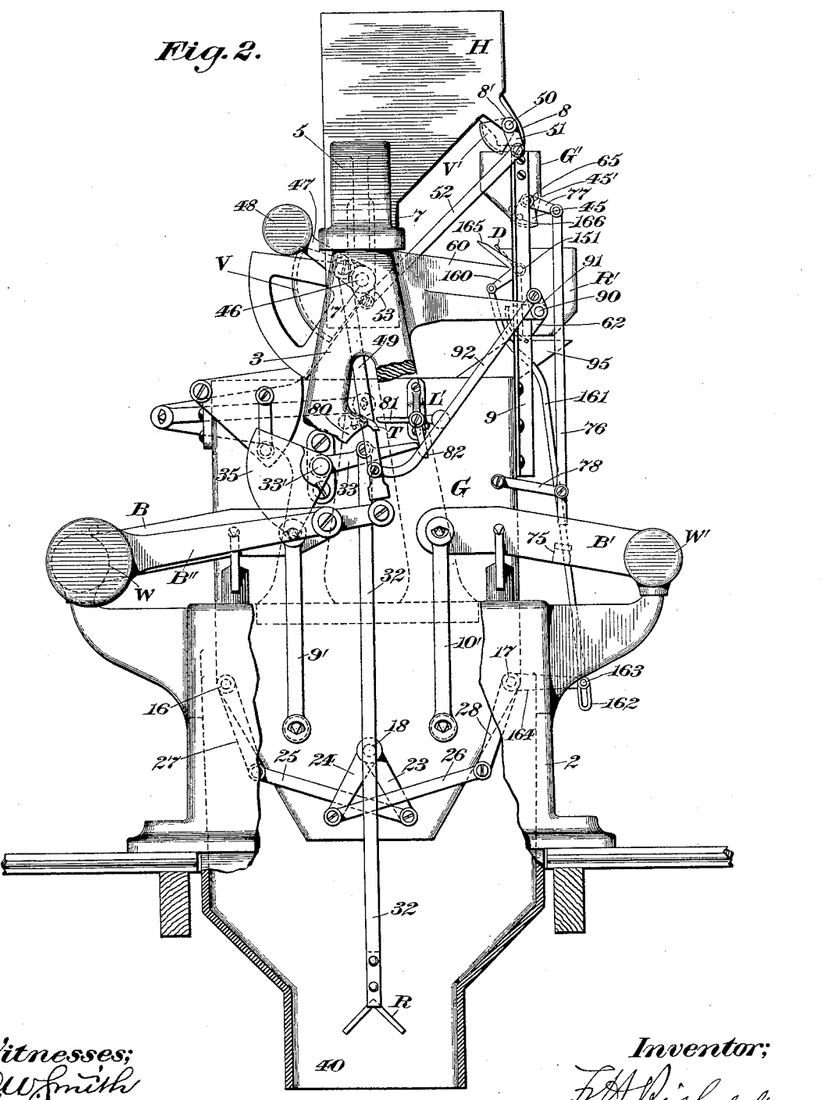
Figs. 2, 3, and 4 are side elevations of the machine as seen from the left in Fig. 1, the parts being represented in the positions they occupy during the making and discharging of a load, and portions of the framework being broken away in Figs. 2 and 4.
Figures 3, 8:
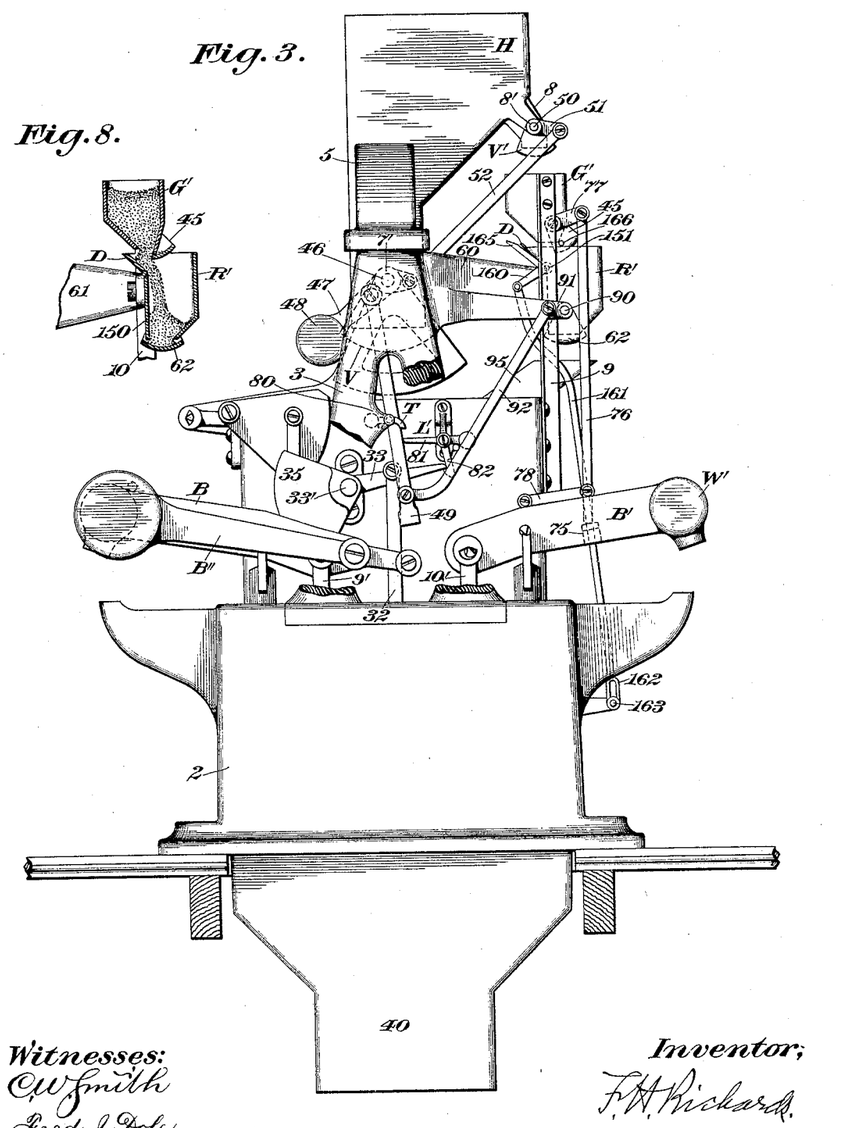
Fig. 8 is a detail view of said auxiliary load-receiver and the surplus-receiver, a stream being shown flowing from the former into the latter.

For the purpose of withdrawing the surplus from the auxiliary receiver G' the valve 45 is opened, as will hereinafter appear, to permit a stream to pass into the stationary surplus-receiver R', fixed between the arms 60 and 61 on the side frames, the discharge of the surplus-receiver being also controlled by a valve, as 62, which is shut during the removal of the material, as just set forth. The valve 45 of the auxiliary receiver G' is preferably opened by the weighing mechanism, the beam B' serving for this purpose, said beam having on its counterpoised side the actuator or projection 75, coöperative with the rod 76, pivoted to the crank-arm 77 of the valve, as shown in Fig. 2, the rod 76 being preferably connected by the guide-link 78 with the load-receiver G. As the load-receiver G descends the counterpoised side of the beam B' will ascend, and when the parts have reached the limits of their respective movements the actuator 75 will strike the lower end of the rod 76, as indicated in Fig. 3, thereby swinging the valve 45 open, so that part of the contents of the auxiliary receiver G' can pass therefrom to the surplus-receiving receptacle R'. As the material starts to flow from the auxiliary receiver G' it, with the receiver G, will rise, the actuator 75 thereby falling away from the rod 76, so that the valve 45 is permitted to close by gravity, the latter operation being completed when the surplus is completely withdrawn, at which point the closer mechanism is released by the tripping of the latch L'.

The latch L' is tripped by the by-pass tripper T of the usual construction, carried upon the projection 80 on the inside of the side frame 3, the arm 81 of said latch being designed to engage the tripper on the ascent of the load-receiver G or when the weighing mechanism reaches the so-called "poising-line," so that the arm 82 of said latch is disengaged from the crank-arm 33, thereby releasing the several closers.

It will be evident from the preceding description that the material in the receiver G' constitutes a part of the predetermined load on the discharge of the main receiver, the latter operation being obtained in the present case by the opening of the closer mechanism.

My present invention involves overloading and load-reducing means, the overloading means serving to deliver to the receivers G and G' a quantity of material in excess of the predetermined load, and the surplus being subsequently removed. This last-mentioned result is secured by the operation of the valve 45 to permit a portion of the contents of the receiver G' to enter the surplus-receiver R'.

It has also been stated that the material within the receiver G' when the surplus has been entirely removed constitutes a part of the true load, and for discharging the receiver G' concurrently with the discharge of the receiver G, I may employ the following means, involving a deflector D, shiftable in one direction to permit the surplus removed from the weighing mechanism or the receiver G' to enter the surplus-receiver R', said deflector being operable subsequently in a different direction to prevent the entrance of material into the surplus-receiver. The deflector D constitutes a part of the front wall 150 of the surplus-receiver R', it being carried by the shaft 151, supported by the opposite side walls of the receiver R'. The deflector D consists, preferably, of a flat plate and is shown occupying its normal position in Fig. 2, it being disposed at such an angle that when the valve 45 is opened by the beam B' in the manner hereinbefore specified a quantity of material can escape from the receiver G' and, striking the deflector D, will thereby be directed into the receiver R, as shown in Fig. 3. When the counterpoised side of the beam B' drops, the actuator 75 will fall away from the rod 76, so that the valve 45 can be closed by gravity to stop the further withdrawal of material from the receiver G'.

On the tripping of the latch to effect the release of the closers 12, 13, 14, and 15 the deflector D will be shifted and the valve 45 of the auxiliary receiver G' will be simultaneously opened, by reason of which the contents of the auxiliary receiver can be directed into the main receiver by the deflector when it is thus shifted.

For operating the deflector D and directing the contents of the auxiliary receiver into the main receiver said deflector is preferably connected with the closer mechanism. The shaft 151, which carries the deflector, is provided with a crank-arm 160, to which the rod 161 is pivoted, said rod having a loop 162 at its lower end embracing a pin 163 on the crank-arm 164 on the closer-shaft 17. The rock-shaft 151 is also provided with an actuator 165, adapted to coöperate with a pin 166 on the valve 45 to swing said valve open on the discharge of the predetermined load, the actuator being operated from the closer mechanism.

Figure 7:
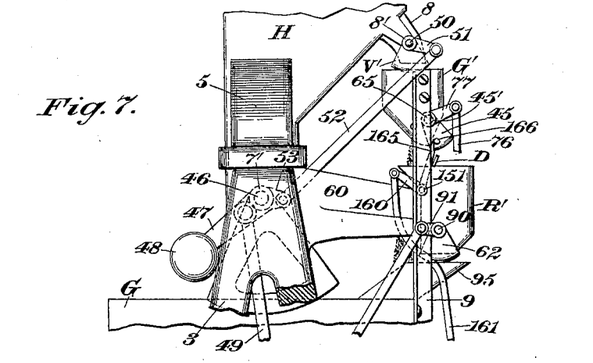
Fig. 7 is a detail view of the load-reducing means.

In Fig. 2 the parts are shown in their normal positions, the pin 163 being at the upper end of the loop 162. On the descent of the load-receiver the pin will be carried downward, and when the load-receiver has reached the limit of such movement the pin will be substantially in contact with the lower end of the loop. When the load-receiver rises on the withdrawal of the surplus, the pin will be carried upward a short distance, and when the latch is tripped in the manner hereinbefore specified the closer 13 will be swung outward or to what is herein shown as the "right," thereby elevating the rod 161 and swinging the plate D under the discharge edge of the valve, and at the same time the actuator 165 will strike the pin 166 on the valve to swing the latter open, as shown in Fig. 7, thereby permitting a portion of the contents from the receiver G' to fall against the deflector-plate D and into the load-receiver G to be discharged with the remainder of the load.

The material within the surplus-receiver is discharged into the main receiver G after the mass has been emptied from the latter. The valve 62 of said surplus-receiver is connected with the thrust-rod 49 in such a manner that when the rod descends the valve 62, by reason of its connection with said rod, will shut. The valve 62 is pivoted for oscillation below the outlet of the receptacle R', it having the projecting shaft portion 90, to which the crank-arm 91 is secured, and to said crank-arm the link 92 is pivoted, the link being similarly attached to the thrust-rod 49 near the lower end of the latter. As the rod 49 is lowered during the loading period it draws the link 92 downward, thereby to swing the valve 62 shut, so that when the surplus is removed from the receiver G' by the opening of the valve 45 the material can enter the receptacle R' and will not escape. When, however, the beam B'' returns to its initial position after the closers are shut, the rod 49 is thrust upward thereby, a similar motion being imparted to the rod 92 to swing the valve 62 open, whereby the contents of the receptacle R' can fall against the inclined chute 95, secured to the load-receiver, to be directed into the latter.

The operation of the hereinbefore-described machine is as follows: Fig. 2 shows the positions occupied by the several parts at the commencement of operation, the closers 12, 13, 14, and 15 being shut and maintained in such position by the latch L' engaging the crank-arm 33, connected to said closers, and the valve 45 being shut and the valves V and V', respectively, being open large and small streams will enter the receivers G and G', respectively, from the main and supplemental supply-chutes 7 and 8 on the supply-hopper H. When a certain quantity of material has been received by the receivers G and G', they will descend, and the auxiliary beam B'', moving in unison therewith and dropping away from the thrust-rod 49, will permit the weight 48 to fall, so as to shut the main valve V and the auxiliary valve V' in the manner hereinbefore set forth, the valves being fully closed when an overload is in the receivers G and G'. When the weighing mechanism is overloaded, the actuator 75 on the counterpoised side of the beam B' will strike the rod 76, thereby swinging the valve 45 open, as indicated in Fig. 3, and permitting the surplus to pass from the receiver G' and into the surplus-receiver R' on the framework. When the weighing mechanism is lightened by the withdrawal of material therefrom, the two receivers G and G' will rise and the actuator or projection 75 will fall away from the rod 76, thereby permitting the valve 45 to shut by gravity. At this point the latch L' has impinged against the tripper T on the framework in the usual manner to release the closer mechanism, whereby the several closers can be swung open or apart by the pressure of the material in the load-receiver G. As the closers open the contents of the auxiliary receiver G' will be emptied into the main receiver G, as hereinbefore specified. When the closers are shut, the several parts will be returned to their primary positions to repeat the operation, and during this period the valve 62 is operated to permit the contents of the receptacle R' to pass into the main receiver G to form the first part of the new load.

Having described my invention, I claim—

1. The combination, with weighing mechanism embodying a plurality of receivers, of means for delivering an overload part of which is supplied to one of the receivers and the remainder to the other receiver; means for removing the surplus; a surplus-receiver; a deflector mounted to coöperate with one of the first-mentioned receivers and with the surplus-receiver; and means for operating said deflector in one direction to permit the surplus to pass from the weighing mechanism and to enter the surplus-receiver and for operating said deflector in a different direction to prevent the entrance of material into said surplus-receiver.

2. The combination, with weighing mechanism embodying a plurality of load-receivers, of means for delivering an overload part of which is delivered to one receiver and the remainder to the other receiver; means for removing the surplus; a fixed surplus-receiver; a deflector mounted to coöperate with one of the load-receivers and with the surplus-receiver; and means for operating said deflector in one direction to permit the surplus to pass from the weighing mechanism and to enter the surplus-receiver and for operating said deflector in a different direction to prevent the entrance of material into said surplus-receiver.

3. The combination, with weighing mechanism embodying a plurality of receivers, of means for delivering an overload part of which is supplied to one of the receivers and the remainder to the other receiver; means for removing the surplus; a surplus-receiver; an oscillatory deflector mounted to coöperate with one of the first-mentioned receivers and with the surplus-receiver; and means for operating said deflector in one direction to permit the surplus to pass from the weighing mechanism and to enter the surplus-receiver and for operating said deflector in the opposite direction to prevent the entrance of material into said surplus-receiver.

4. The combination, with weighing mechanism embodying a plurality of receivers, of means for delivering an overload part of which is supplied to one of the receivers and the remainder to the other receiver; means for removing the surplus; a surplus-receiver; a deflector mounted upon the surplus-receiver; and means for shifting said deflector in different directions to permit or prevent the entrance of material into the surplus-receiver.

5. The combination, with weighing mechanism embodying a plurality of receivers, of means for delivering an overload part of which is supplied to one of the receivers and the remainder to the other receiver; means for removing the surplus; a surplus-receiver; a deflector mounted to coöperate with one of the first-mentioned receivers and with the surplus-receiver; a deflector mounted upon the surplus-receiver and operable in different directions to permit or prevent the entrance of material into said surplus-receiver; and means coöperative with the discharge mechanism for shifting said deflector.

6. The combination, with weighing mechanism embodying a plurality of receivers, of means for delivering an overload part of which is supplied to one of the receivers and the remainder to the other receiver; means for removing the surplus; a surplus-receiver; a deflector-plate mounted for oscillation upon the surplus-receiver; and means for shifting said deflector-plate on the completion of a load.

7. The combination, with weighing mechanism embodying a plurality of receivers, of means for delivering an overload part of which is supplied to one of the receivers and the remainder to the other receiver; means for removing the surplus; a surplus-receiver mounted on the framework between the two first-mentioned receivers; a deflector mounted to coöperate with one of the first-mentioned receivers and with the surplus-receiver; and means for operating said deflector in one direction to permit the surplus to pass from the weighing mechanism and to enter the load-receiver and for operating said deflector in a different direction to prevent the entrance of material into said surplus-receiver.

8. The combination, with weighing mechanism embodying main and auxiliary receivers, of means for delivering an overload part of which is supplied to one of the receivers and the remainder to the other of the receivers; means for removing the surplus; a surplus-receiver; a deflector mounted to coöperate with the auxiliary receiver and with the surplus-receiver; a valve on the auxiliary receiver; and means for simultaneously operating said valve and deflector on the discharge of a load.

9. The combination, with weighing mechanism embodying a plurality of receivers, of means for delivering an overload part of which is supplied to one of the receivers and the remainder to the other receiver; a valve upon one of the receivers; means for operating said valve to remove the surplus; a deflector mounted to coöperate with the valved receiver and with the surplus-receiver; means for shifting said deflector to prevent the entrance of material into the surplus-receiver; and means operative with the deflector for opening said valve.

10. The combination, with weighing mechanism embodying a plurality of receivers, of means for delivering an overload part of which is supplied to one receiver and the remainder to the other receiver; a valve mounted upon one of the receivers; means operative with the weighing mechanism for opening said valve to permit the surplus to pass from the weighing mechanism; a surplus-receiver; a shaft; a deflector carried by said shaft for shifting movement in opposite directions; means for operating said shaft; and a device carried upon the shaft for opening said valve.

11. The combination, with weighing mechanism embodying a plurality of receivers one of which is provided with closer mechanism and the other of which is furnished with a valve, of means for delivering an overload part of which is supplied to one of the receivers and the remainder to the other; means for removing the surplus; a surplus-receiver; means for operating said valve to permit the surplus to escape from the weighing mechanism and enter the surplus-receiver; a deflector shiftable to prevent the entrance of material into the surplus-receiver; and connections between the deflector and the closer mechanism for operating the former.

12. The combination, with a main receiver having a closer provided with a crank-arm; an auxiliary receiver mounted upon the main receiver; a surplus-receiver; means for effecting the removal of the surplus from the auxiliary receiver; a deflector shiftable to prevent the entrance of material into the surplus-receiver; a shaft carrying the deflector and having a crank-arm; and a rod pivoted to said crank-arm and terminating in a loop embracing the pin on the first-mentioned crank-arm.

13. The combination, with weighing mechanism embodying a load-receiver, of a pair of main closers and a pair of auxiliary closers, a closer of each pair being supported for movement toward and from a coöperating closer of the other pair as said closers alternately open and shut.

14. The combination, with weighing mechanism embodying a load-receiver, of a pair of main closers and a pair of auxiliary closers, a closer of one pair being supported for movement toward and from a coöperating closer of the other pair as said closers open and shut; a shaft for supporting the auxiliary closers, one of the latter being fixed to said shaft and the other being loose thereon; and connections between the said closers.

15. The combination, with weighing mechanism embodying a load-receiver, of a pair of main closers and a pair of auxiliary closers, a closer of each pair being supported for movement toward and from a coöperating closer of the other pair as said closers open and shut; a shaft supporting the auxiliary closers, one of the latter being fixed to said shaft and the other being loosely sleeved thereon; a crank-arm extending from the shaft; a second crank-arm on the sleeve of the auxiliary closer, that is loose on the shaft; and connections between said crank-arms and the main closers.

16. The combination, with weighing mechanism embodying a load-receiver, of a pair of main closers at opposite sides thereof; shafts carried by the load-receiver, for sustaining said main closers; a pair of auxiliary closers intermediate the main closers; a shaft for supporting the auxiliary closers; and connections between said last-mentioned shaft and the shafts which support the main closers, for causing simultaneous motion of the closers.

17. The combination, with weighing mechanism embodying a load-receiver, of a pair of main closers at opposite sides of the load-receiver; shafts for supporting the main closers; a pair of auxiliary closers situated between the main closers; a shaft for supporting the auxiliary closers, one of the latter being fixed to said shaft and the other being sleeved thereto; a pair of crank-arms, one of these being fixed to the shaft that carries the auxiliary closer and the other fixed to a sleeve of the other auxiliary closer; links connected to said crank-arms; and crank-arms on the shafts of the main closers, connected with said links.

18. The combination, with weighing mechanism embodying a load-receiver, of a pair of main closers and a pair of auxiliary closers, a closer of each pair being supported for movement toward and from a coöperating closer of the other pair as said closers open and shut; connections between the several closers, for causing the simultaneous movement thereof; and a regulator connected with the closer mechanism.

19. The combination, with weighing mechanism embodying a load-receiver, of a pair of main closers and a pair of auxiliary closers, a closer of each pair being supported for movement toward and from a coöperating closer of the other pair as said closers open and shut; connections between the several closers for causing the simultaneous operation thereof; linkage joining the auxiliary closers; and a regulator connected with the linkage.

20. The combination, with weighing mechanism embodying a load-receiver, of a pair of main closers and a pair of auxiliary closers, a closer of one pair being supported for movement toward and from a coöperating closer of the other as said closers open and shut; connections between the closers; a rod coöperative with the closers; and means for holding the rod against action.

21. The combination, with weighing mechanism embodying a load-receiver, of a pair of main closers and a pair of auxiliary closers, a closer of each pair being supported for movement toward and from a coöperating closer of the other pair; connections between the closers; a pair of rods coöperative with the closers and extending below the load-receiver; and a regulator secured between said rods.

FRANCIS H. RICHARDS.

Witnesses:
F. N. CHASE,
JOHN O. SEIFERT.